United States Patent [19]

Sullivan, Jr. et al.

[11] 4,235,426
[45] Nov. 25, 1980

[54] SHOCK ABSORBER WITH COMPRESSION SPRING AND DUST TUBE

[75] Inventors: Leo S. Sullivan, Jr.; Patsy DeVincent, both of Dayton; Wendell M. Oldham, Jr., Trotwood, all of Ohio

[73] Assignee: General Motors Corporation, Detroit, Mich.

[21] Appl. No.: 29,360

[22] Filed: Apr. 11, 1979

[51] Int. Cl.³ .......................... F16F 9/38; F16F 9/48
[52] U.S. Cl. ................................ 267/8 R; 188/322; 267/35
[58] Field of Search .................. 267/8 R, 33, 35, 140, 267/140.1, 141, 141.3, 141.4, 152, 153; 188/322

[56] References Cited

U.S. PATENT DOCUMENTS

| | | | |
|---|---|---|---|
| 3,263,983 | 8/1966 | Bliven | 267/8 R |
| 3,346,272 | 10/1967 | Smith | 267/8 R |
| 3,499,505 | 3/1970 | De Carbon | 267/8 R |
| 3,830,347 | 8/1974 | Fader et al. | 188/322 |
| 3,997,150 | 12/1976 | Hanson et al. | 267/140 |
| 4,175,771 | 11/1979 | Muzechuk | 267/8 R |

FOREIGN PATENT DOCUMENTS 2645773  4/1978  Fed. Rep. of Germany .......... 267/8 R
1083382  9/1967  United Kingdom .

OTHER PUBLICATIONS

*Repair Manual, Type 43*, Audi 5000, 1st Edition, 42.2 Rear Suspension and Axle, Aug. 1977.

Primary Examiner—Edward R. Kazenske
Attorney, Agent, or Firm—Charles R. White

[57] ABSTRACT

Shock absorber unit with polymeric convoluted compression spring having a variable spring rate is carried by the piston rod above the seal cover of the unit. The lower portion of the compression spring is formed with a series of mounting and stabilizing lips for the attachment of a dust tube encircling and protecting the upper portion of the piston rod. A rigid insert in the inner end of the compression spring prevents the polymeric material from flowing over the end of the shock absorber when the spring is under full compression loads and displacing the dust tube from its mounting.

3 Claims, 6 Drawing Figures

SHOCK ABSORBER WITH COMPRESSION SPRING AND DUST TUBE

This invention relates to shock absorbers and more particularly to a new and improved compression spring and dust tube assembly for a shock absorber such as used in vehicle suspension systems to dampen suspension spring ride motions.

Suspension system components of many modern vehicles combine various suspension and dampening functions in order to effect weight and space savings. An example of this is the combination shock absorber and compression spring employed in many compact type vehicles. This invention concerns a new and improved compression spring which installs on a vehicle shock absorber to dissipate vehicle ride impact forces resulting from road and load conditions and also serves as a suspension overload spring. Additionally, this invention provides a new and improved integral means for attachment of a dust tube for the shock absorber.

The primary function of absorbing impact forces from compression loads is accomplished through specific load deflection rate characteristics of the compression spring of this invention. A predetermined desired rate is achieved through specifically designed convolutions in the body of the compression spring and the selection of an appropriate polymeric material. The convolutions of the compression spring react progressively to ride impact forces giving a soft initial attenuation of suspension travel for soft ride. Resistance gradually builds up in the spring commensurate with higher force levels compressing the spring to prevent contact between the sprung and unsprung parts of the vehicle. The top portion of the compression spring is essentially a solid mass of elastomer material which reacts to compression forces deflecting the convolutions and serves as a positive suspension stop in the event the convolutions become overloaded.

In addition to reacting to impact loads, the compression spring also serves as an auxiliary spring working with the vehicle suspension springs when loads exceed a predetermined percentage of gross vehicle weight. The spring rate characteristics are specifically designed for these predetermined load conditions through the proper shape and specification of the material used for the compression spring.

A further function of the compression spring of this invention is to provide a new and improved means for the attachment and stabilized support of the shock absorber dust tube. The dust tube is preferably a plastic cylinder that protects the shock absorber piston rod from stone and abrasion damage when in the extended position. The shape and location of the dust tube mounting lips facilitate the assembly of the dust tube onto the compression spring. An integral metal insert is incorporated in the design to prevent lip distortion by the flow of the material of the spring over the top of the shock absorber when the spring is under high compression loads. This prevents the material of the spring from displacing the dust tube from its mounting. Dust tube assembly is facilitated through the segmented mounting lips which flex to permit tube installation with either a rotary threading motion or a straight press fit. This provides a substantial reduction in assembly effort and time as compared to prior construction.

The underside of the compression spring is concavely formed to correspond to the convex formation of the seal cover which closes the upper end of the shock absorber. A radial groove in the end of the compression spring provides an air bleed or exhaust so that air cannot be trapped between the spring and shock. With this exhaust, the shock absorber will not act as a compressor to force air into the shock absorber. The mounting lips are preferably in two rows which are offset from each other to keep the dust tube centered with respect to the piston rod and shock absorber. This prevents the dust tube from becoming cocked at full shock extension and so that the free end will not catch on the seal cover and the tube will not be crushed or be otherwise damaged on rebound.

These and other features, objects and advantages of this invention will be more apparent from the following drawings in which.

Figure 1:
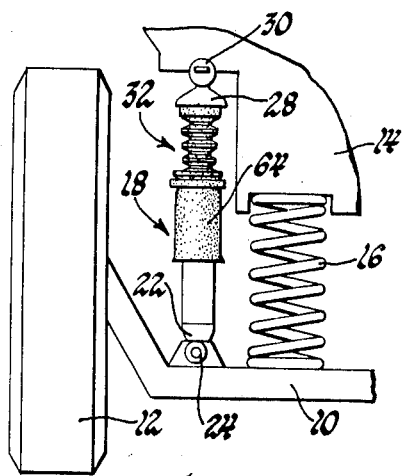
FIG. 1 is a diagram illustrating the rear suspension and axle of a vehicle.

Turning now in greater detail to FIG. 1, there is diagrammatically illustrated a rear suspension for a vehicle in which an axle in axle housing 10 rotatably supports a road wheel 12. The vehicle body 14 is supported by a helical suspension spring 16 operatively mounted between the body and the axle housing. A shock absorber unit 18 is operatively mounted between the sprung and unsprung masses of the vehicle provided by the vehicle body and the wheel and axle construction respectively to dampen suspension spring action occurring during vehicle driving operations.

The shock absorbing unit 18 comprises a suitable double acting hydraulic shock absorber such as depicted in U.S. Pat. No. 2,997,291 issued Aug. 22, 1961 to C. S. Stultz the disclosure of which is hereby incorporated by reference.

The shock absorber has a conventional base cup 22 supporting a lower mount 24 which is pivotally connected to the axle housing of the vehicle. The shock absorber also has a piston rod 26 attached to a piston operatively mounted in an oil filled cylinder tube as described in the patent referenced above. Attached to the upper end of the piston rod 26 is a cover plate 28 and an upper mount 30 pivotally connecting the piston rod to the vehicle body 14. As the vehicle is being driven the ride motions of the sprung vehicle body will be damped as the shock absorber telescopes inwardly on compression stroke and elongates on rebound as will be appreciated by those skilled in this art.

Figure 2:
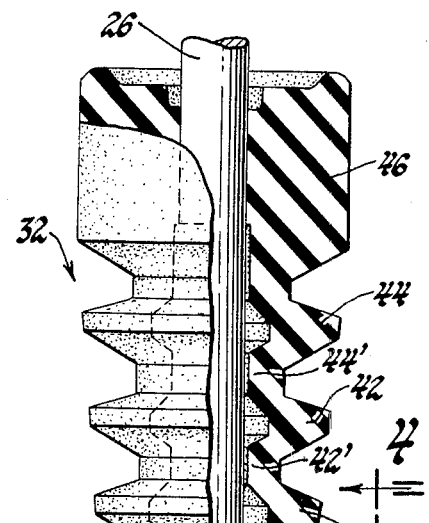
FIG. 2 is an elevational view partly in cross section of a compression spring and dust tube of the shock absorber of FIG. 1.
Figure 3:
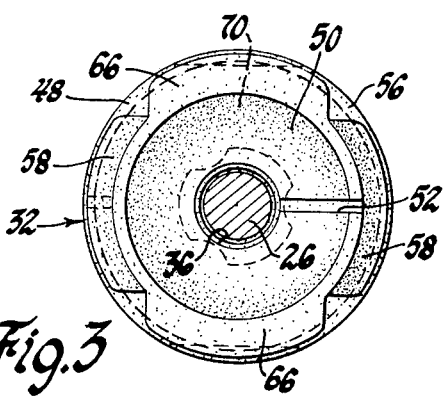
FIG. 3 is a cross sectional view taken along lines 3—3 of FIG. 2.
Figure 5:
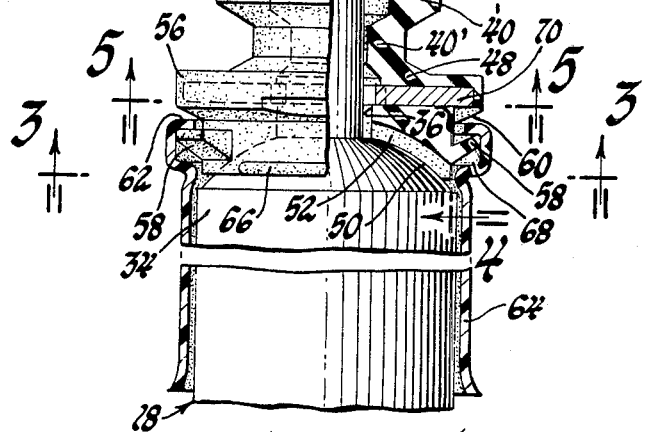
FIG. 5 is a cross sectional view taken along lines 5—5 of FIG. 2.
Figure 5:
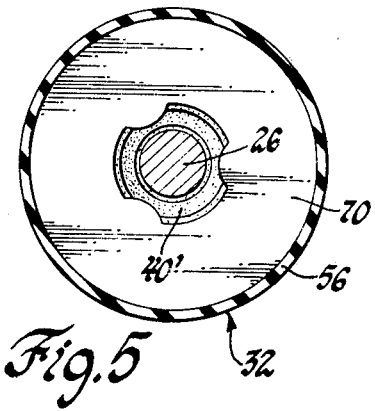
Figure 6:
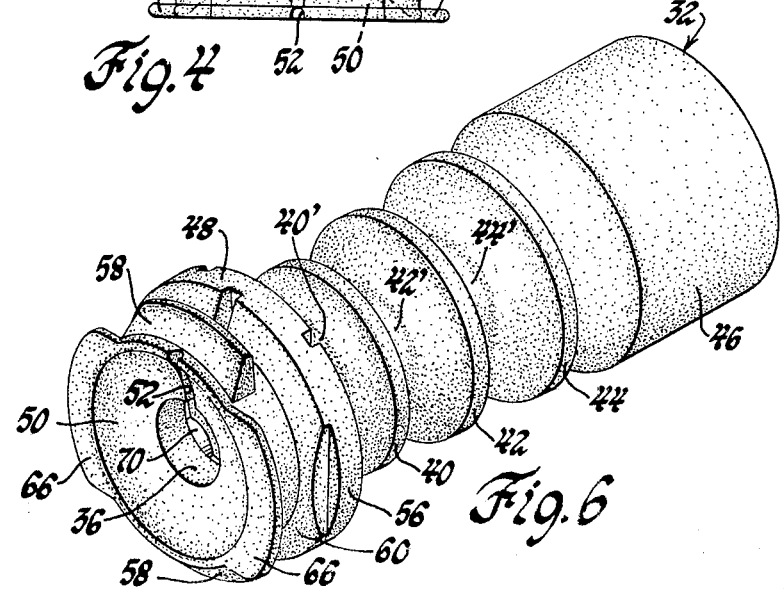
FIG. 6 is a perspective view of the compression spring of FIGS. 1-5 in accordance with this invention.

As best shown in FIG. 2, the shock absorber unit 18 has an elongated and convoluted compression spring 32 which is preferably molded from a suitable polymeric material into a generally cylindrical body. The compression spring 32 has an axial opening 36 through which the piston rod 26 extends. As shown in FIGS. 2 and 6, the compression spring has a central portion having a plurality of axially spaced annular convolutions formed by external convolutions 40, 42 and 44 and internal convolutions 40', 42' and 44'. These convolutions form a serpentine variable rate spring portion intermediate the upper portion 46 and lower portion 48 of the compression spring. The axially spaced internal convolutions of the intermediate portion provide internal gripping rings for the gripping engagement with the piston rod 26 when under compression. The spaces between the internal and external convolutions provide room for the polymer material of the spring when the spring is deflected and the convolutions move from their relaxed FIG. 2 position to a compact position in which they are closely stacked upon one another. The spring rate provided by the convolutions gradually increases commensurate with higher force levels applied to the compression spring through the shock absorber. Thus, the spaced convolutions forming the intermediate portion of the compression spring react progressively to road impact forces applied to the shock absorber unit through the road wheel 12 initially giving a soft attenuation of suspension travel for soft ride feel. As increased compression loads are exerted, the spring rate provided by the convolutions gradually increases in accordance with higher force levels.

The upper portion 46 of the compression spring is essentially a solid mass of polymer material which reacts by deflection in response to exertion of large compression loads stacking the convolutions against one another. The upper portion 46 thus provides a positive suspension stop in the event that there is full compression in the convolutions and impact forces are transmitted therethrough. The upper portion inside diameter is reduced to provide gripping engagement with the piston rod.

Figure 4:
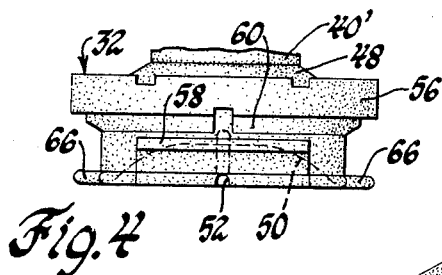
FIG. 4 is a side view taken along lines 4—4 of FIG. 2.

The lower portion 48 of the compression spring is generally cylindrical in shape with a terminal end providing a surface for the direct engagement with the seal cover of the shock absorber on compression stroke. As best shown in FIGS. 2, 4 and 6, the lower portion of the compression spring has a concave inner surface 50 which is adapted to mate with the convex outer surface of the shock absorber seal cover 34. A radial groove 52 is provided in the surface 50 to provide an exhaust to prevent the entrapment of air between the seal cover and the compression spring on the compression stroke of the shock absorber. This ensures that air is not trapped and pumped into the shock absorber by reciprocating piston rod action.

In addition to the special concave contact surface 50, the lower portion of the compression spring is provided with a circumferentially extending shoulder 56 spaced below the first convolution 40. Spaced immediately below the shoulder are a pair of radially extending mounting tabs or lips 58 which are diametrically opposed to one another. The restricted spaces 60 formed between the mounting lips 58 and the soulder 56 are adapted to receive the inwardly extending annular retainer edge 62 of a plastic cylindrical dust tube 64 preferably molded from polyethylene which extends downwardly in a coaxial relationship with the piston rod 26 and the cylindrical tubing of the shock absorber as best shown in FIG. 1. The mounting lips are somewhat triangular in cross section and are capable of being deflected by the relatively stiff edge 62 of the dust tube as it is axially inserted onto the compression spring. Axially spaced and offset by 90 degrees from the retainer lips 58 are a pair of diametrically opposed stabilizer tabs or lips 66. These stabilizer lips fit into an annular groove 68 formed in the upper end of the dust tube to reduce any tendency of the dust tube to rock as it moves upwardly with the piston rod. When fully extended the dust tube is held in its coaxial position so that the free end will not contact the seal cover of the shock absorber on the subsequent compression stroke. This prevents the dust tube from being dislodged from the mounting lips or from being otherwise damaged on compression stroke.

The lower portion of the compression spring has an enlarged washer-like metal insert 70 which is coaxial with the opening 36. This rigid insert prevents the elastomer material of the compression spring from flowing over the upper portion of the shock absorber on full compression stroke so that the material will not displace the dust tube from its mounting.

With this construction, there is provided a new and improved one piece compression spring which can be readily molded from a suitable polymer material and that has an improved quick fastener for a plastic dust tube that orients the dust tube in a coaxial relation with respect to the piston rod and the shock absorber tubing. The washer insert prevents the flow of the material of the compression spring onto the dust tube to prevent the material from displacing the dust tube from its mounting. The spring rate characteristics of the compression spring can be varied by varying the shape of the convolutions of the spring and the thickness of the convolutions to provide for a selected spring rate. The convolutions react progressively to road impact forces giving a soft initial attenuation of suspension travel for soft ride. With larger impact forces, the spring rate of the preferred embodiment increases commensurate with the higher force level. Dust tube assembly is facilitated through the segmenting of the mounting lips which advances tube installation with either a rotary threading motion or a straight press fit to provide a significant improvement in reducing assembly effort and time.

While a preferred embodiment of this invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. In combination a hydraulic shock absorber and a compression spring for use in a vehicle suspension, said shock absorber having a piston operatively mounted for reciprocating movement therein and having a cylindrical piston rod extending from an upper end thereof, a cover plate secured to an upper portion of said piston rod, said compression spring being of polymeric material and disposed between said cover plate and the upper end of said shock absorber, said spring having a central axial opening formed therein with a plurality of axially spaced convolutions providing internal rings of reduced diameter circumferentially gripping said piston rod, said compression spring having a lower end portion disposed adjacent to the upper end of said shock absorber, a cylindrical dust tube extending axially from said lower end portion of said compression spring around said piston rod, attachment means securing said dust tube to said lower end portion of said compression spring, and a rigid insert plate disposed in said lower end portion of said compression spring to restrict the deflection of the material of said compression spring from downward flow onto said shock absorber to thereby prevent said compression spring from dislodging said dust tube from said attachment means.

2. In combinaion a tubular hydraulic shock absorber and a compression spring for use in a vehicle suspension, said shock absorber having a piston operatively mounted for reciprocating movement therein and having a cylindrical piston rod extending from an upper end of said shock absorber, a cover plate secured to an upper portion of said piston rod, said compression spring being formed from a resilient polymer material with a central axial opening formed therein for gripping engagement with said rod, said spring having a plurality of axially spaced convolutions providing a resilient spring portion intermediate the upper and lower ends of said spring, said compression spring having a lower end portion disposed adjacent to the upper end of said shock absorber, a cylindrical dust tube of plastic extending from said lower end portion of said compression spring around said piston rod, a first pair of resilient lips extending outwardly of said lower end portion providing attachment means securing said dust tube to said compression spring, a second pair of resilient lips displaced axially below and circumferentially offset from said first pair of lips to contact the inner wall of said dust tube to maintain said dust tube in coaxial relationship with said piston rod and said shock absorber, and air bleed passage means in the lower face of said spring for the exhaust of air therethrough in respone to contact of said lower face by said shock absorber and the subsequent compression of said spring.

3. A compression spring and dust tube assembly for hydraulic shock absorber having a reciprocably movable piston rod extending from one end thereof, said compression spring of said assembly being a polymeric member generally cylindrical in formation having a central axial opening therein for reception of said piston rod, said compression spring having a series of axially separated convolutions and a cylindrical shoulder extending axially from a first of said convolutions forming one end of said compression spring, said shoulder having first arcuately spaced mounting lips diametrically opposed fromm one another extending radially outwardly from said shoulder, said shoulder having second arcuately spaced and radially projecting mounting lips disposed on said shoulder between said first convolution and said first mounting lips, said second mounting lips being circumferentially offset with respect to said first mounting lips, a thin-walled dust tube of plastic material surrounding said shock absorber, said dust tube having an annular groove adjacent to the upper end thereof and having an upper inwardly extending retainer edge for deflecting said first mounting lips in response to the axial movement of said dust tube onto said shoulder, said second mounting lips being axially spaced from said first convolution to provide a groove to receive said retainer edge subsequent to deflection of said second mounting lips by said retainer edge by said axial movement to thereby hold said tube in fixed axial position with respect to said compression spring, said first lips being disposed against the inner wall of said tube to stabilize said tube in position to reduce tube rocking on outward telescopic movement of said piston rod to thereby center said tube with respect to said shock absorber on the compression stroke thereof.

* * * * *